(12) United States Patent
Karn (10) Patent No.: US 7,921,166 B2
(45) Date of Patent: Apr. 5, 2011

(54) METHODS AND SYSTEMS FOR ACCESSING EMAIL

(75) Inventor: Keith S. Karn, Avon, NY (US)

(73) Assignee: Xerox Corporation, Norwalk, CT (US)

( * ) Notice: Subject to any disclaimer, the term of this patent is extended or adjusted under 35 U.S.C. 154(b) by 1069 days.

(21) Appl. No.: 11/453,649

(22) Filed: Jun. 15, 2006

(65) Prior Publication Data

US 2006/0236142 A1    Oct. 19, 2006

(51) Int. Cl.
*G06F 15/16* (2006.01)
*G06F 15/167* (2006.01)
*G06F 3/12* (2006.01)
(52) U.S. Cl. ............. 709/206; 709/216; 358/1.15
(58) Field of Classification Search .......... 709/204, 709/206, 216; 358/1.15, 402, 403
See application file for complete search history.

(56) References Cited

U.S. PATENT DOCUMENTS

| | | | |
|---|---|---|---|
| 5,682,540 A * | 10/1997 | Klotz et al. ............ 715/209 |
| 6,397,245 B1 | 5/2002 | Johnson et al. | |
| 6,400,810 B1 * | 6/2002 | Skladman et al. ...... 379/93.24 |
| 6,571,285 B1 | 5/2003 | Groath et al. | |
| 6,728,346 B2 * | 4/2004 | Czyszczewski et al. ... 379/93.03 |
| 6,873,430 B2 | 3/2005 | Grasso et al. | |
| 6,970,758 B1 | 11/2005 | Shi et al. | |
| 6,985,901 B1 | 1/2006 | Sachse et al. | |
| 7,171,615 B2 | 1/2007 | Jensen et al. | |
| 2002/0184317 A1 * | 12/2002 | Thankachan ............ 709/206 |
| 2003/0012415 A1 * | 1/2003 | Cossel .................... 382/124 |
| 2005/0086187 A1 | 4/2005 | Grosser et al. | |
| 2005/0111047 A1 | 5/2005 | Rhoads | |
| 2005/0114283 A1 | 5/2005 | Pearson et al. | |
| 2005/0144189 A1 | 6/2005 | Edwards et al. | |
| 2006/0242590 A1 | 10/2006 | Polivy et al. | |

* cited by examiner

*Primary Examiner* — Larry Donaghue
*Assistant Examiner* — Brian J Gillis
(74) *Attorney, Agent, or Firm* — Fay Sharpe LLP (57) ABSTRACT

A system is provided that prints email messages. The system includes a document surrogate that represents one or more email messages and a multifunction device that at least one of prints, scans, emails, faxes, and copies one or more documents. The multifunction device includes a scanning element that scans the document surrogate and electronically encodes information contained therein, a retrieval component that retrieves the one or more emails based at least in part upon information contained in the document surrogate; and a printing element that prints the one or more emails retrieved. The information is associated with at least one of the location, content, and status of the one or more email messages.

19 Claims, 10 Drawing Sheets

Fig. 11

METHODS AND SYSTEMS FOR ACCESSING EMAIL

CROSS REFERENCE TO RELATED PATENTS AND APPLICATIONS

This application claims priority from U.S. patent application Ser. No. 10/161,010 filed Feb. 1, 2002 and is incorporated herein by reference.

BACKGROUND OF THE INVENTION

1. Field of the Invention

The present invention relates generally to methods and systems for accessing email and more particularly to methods and systems for accessing email using a printing-capable device via a network.

2. Description of Related Art

Conventional email access requires a user to access a workstation or other terminal, to authenticate with that terminal and subsequently access email using an email program which interacts with a mail server that is networked with the terminal. These users generally are not able to access their email when they are away from their workstations.

SUMMARY OF THE INVENTION

The invention is directed to methods and systems for providing email access on any printing-capable device which is networked with a mail server. The user is able to approach the printing-capable device, access a user interface on the device, request access to the user's email and, after authentication, receive access to that email. The device enables the user to retrieve email messages from a mail server and prints out messages selected by the user. The device may also print attachments to the messages.

In embodiments of the present invention, the user may approach a multi-function device such as a copier/printer/scanner, access a user interface which authenticates the user with a user name and password, then use the interface to access the user's email from the user's personal email inbox. The interface may display message headers and enable the user to select headers for which the user desires to view a printout of the entire email message. The device then retrieves email messages that correspond with the selected headers and prints the messages.

In one aspect, a system prints email messages. A document surrogate represents one or more email messages. A multifunction device at least one of prints, scans, emails, faxes, and copies one or more documents. The multifunction device includes a scanning element that scans the document surrogate and electronically encodes information contained therein, the information relates to at least one of the location, content, and status of the one or more email messages. The multifunction device also includes a retrieval component that retrieves the one or more emails based at least in part upon information contained in the document surrogate, and a printing element that prints the one or more emails retrieved.

In another aspect, a multifunction device retrieves messages. An authentication component identifies a user based upon information entered by the user. A retrieval component locates and retrieves one or more emails based at least in part upon the user's identification. A presentation component displays the one or more emails retrieved by the retrieval component, wherein the user selects one or more emails. A printing element prints a document surrogate that is representative of the one or more emails selected by the user.

In yet another aspect, a method is employed to print email. A document surrogate represents one or more email messages. One or more email messages are selected via the document surrogate. The document surrogate is scanned via a multifunction device. One or more emails are retrieved and printed based at least in part upon the document surrogate.

DETAILED DESCRIPTION

Figure 1:
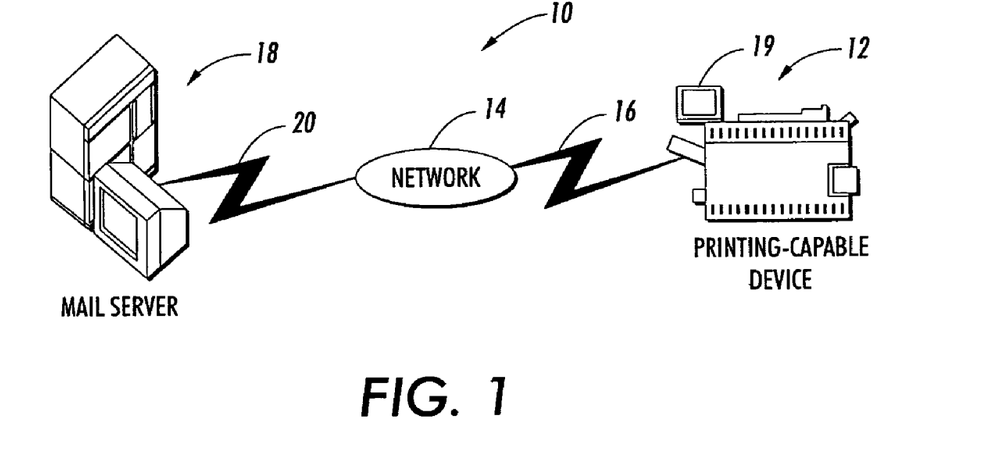
FIG. 1 is a schematic representation of a system for accessing email in accordance with an exemplary embodiment.

FIG. 1 shows a system 10 for accessing email from a printing-capable device. The system 10 includes a printing-capable device 12 in communication with a network 14 via a communication link 16. The network 14 is in communication with a mail server 18 via a second communication link 20. The printing-capable device 12 includes a monitor 19 which is adapted to display a user-interface 22 for providing access to a user's email inbox which is resident on the mail server 18. The system 10 may or may not also be connected to one or more other systems and/or other distributed networks, as well as one or more other devices 12.

The device 12 may be any device as long as it has the capability of printing an email message. The device 12 may be a copier, a printer, a fax machine and/or a multi-function device and still form a part of the invention.

While FIG. 1 shows the system 10 and associated components collocated, it is to be appreciated that the various components of the system 10 can be located at distant portions of a distributed network, such as a local area network, a wide area network, an intranet and/or the Internet, or within a dedicated system. Thus, it should be appreciated that the components of the system 10 can be combined into one device or collocated on a particular node of a distributed network. As will be appreciated from the following description, and for reasons of computational efficiency, the components of the system 10 can be arranged at any location within a distributed network, except that the printing-capable device would contain the user interface for email retrieval without affecting the operation of the system.

Furthermore, the links 16 and 20 can be wired or wireless links or may also be any known or later developed data transmission links that are capable of supplying electronic data to and from the connected elements.

Figure 2:
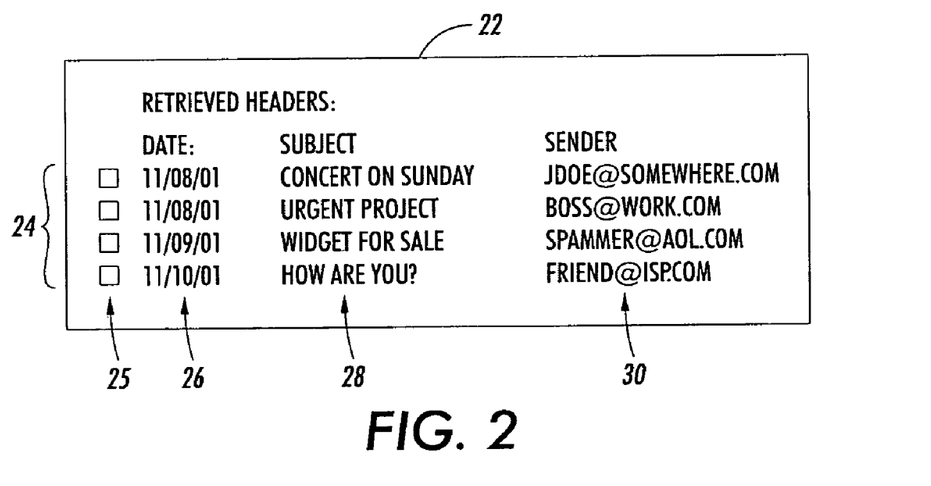
FIG. 2 is a schematic representation of a user interface for a printing-capable device for accessing email in accordance with an exemplary embodiment.

FIG. 2 shows a user-interface 22 in accordance with the invention. The user-interface 22 provides a listing of message headers 24. In this embodiment, the user-interface 22 displays the date 26, the subject 28 and the sender 30 for each of the e-mail headers 24. A user is able to then select one or more of the headers 24 using an input device (not shown). For example, the user may use the input device to check the buttons 25 to indicate on the display which email headers 24 have been selected. The input device, which may be, for example, a keyboard, mouse, speech-to-text system, touchscreen, or the like, with the aid of an I/O interface, a memory and a controller, interfaces with the device 12 (FIG. 1). In response to the selection, the printing-capable device 12 retrieves the entire message which corresponds to the selected header 24 from the mail server 18 and prints the message and, optionally, prints out attachments to the message. In order to print attachments, it may be necessary to program the device 12 with the software applications which correspond to those attachments.

Figure 3:
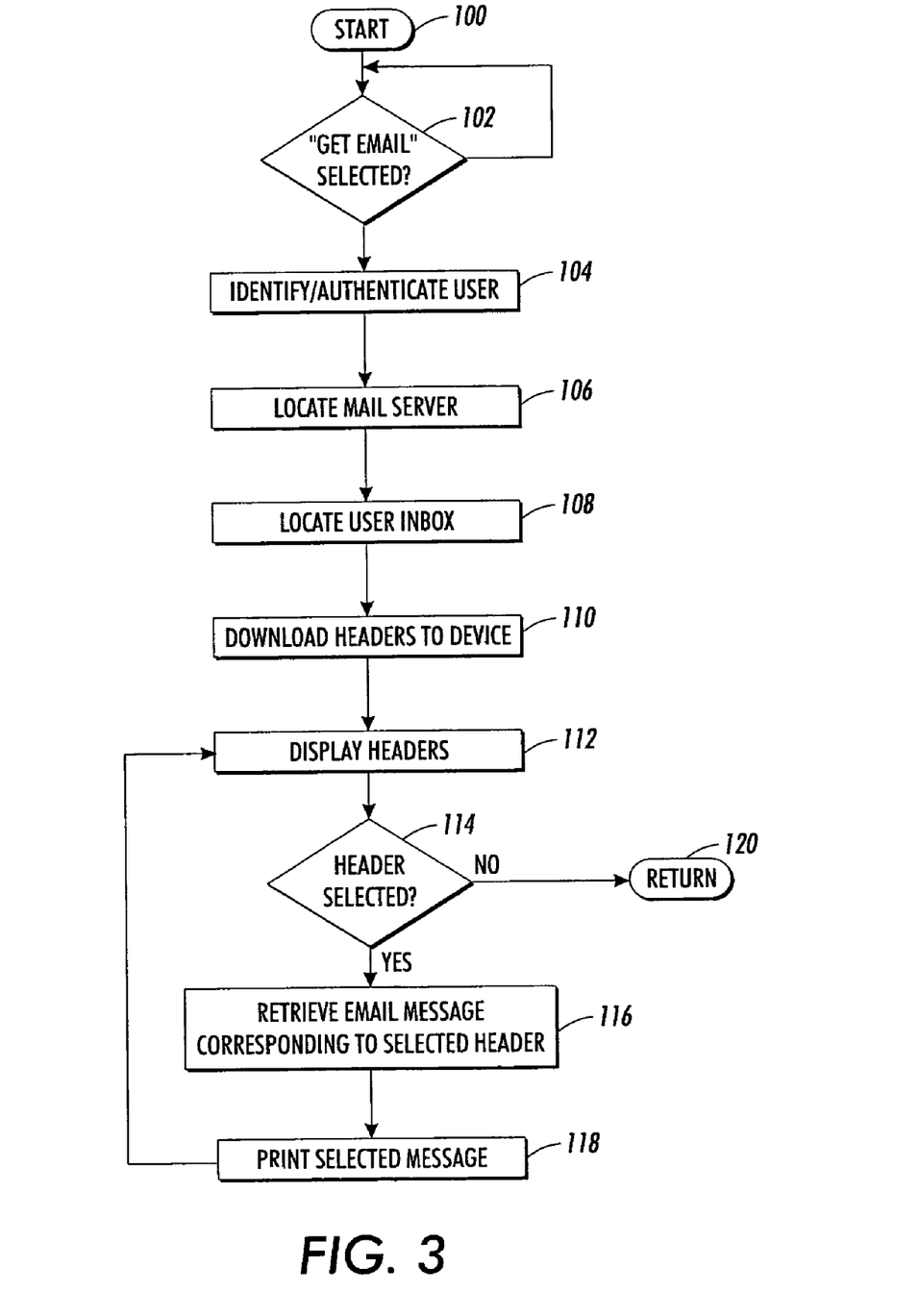
FIG. 3 is a flowchart outlining one exemplary control routine in accordance with an exemplary embodiment.

FIG. 3 shows a flowchart outlining a control routine which executes a method in accordance with the invention. The control routine starts at step 100 and continues to step 102. In step 102, the control routine determines whether a user has accessed the "get email" function on the user-interface of the printing-capable device 12. If, in step 102, the control routine determines that the "get email" function has been selected, then the control routine continues to step 104. If, however, in step 102, the control routine determines that the "get email" function has not been selected, then the control routine returns to step 102.

In step 104, the control routine conducts an identify/authenticate user procedure. For example, the routine may accept a user name and password from the user to determine whether the user has the correct security rights to access the appropriate account on the mail server, the control routine may receive the user's name, password, email address, email server and the like. Optionally, the user may have been authenticated by the device 12 for other purposes or the user may have been authenticated before the "get email" function is selected. The control routine then continues to step 106. In step 106, the control routine locates the appropriate mail server 18 via the network 14. The control routine then continues to step 108 where the control routine locates the user's email inbox on the mail server 18 and continues to step 110. In step 110, the control routine downloads the headers from the user's email inbox to the printing-capable device 12 and continues to step 112. In step 112, the control routine displays the headers 24 in a user-interface 22 and continues to step 114. In step 114, the control routine determines whether a header 24 (or multiple headers) has been selected on the user-interface 22. If, in step 114, the control routine determines that a header(s) has been selected, then the control routine continues to step 116. If, however, in step 114, the control routine determines that no header has been selected, then after a set period of time the control routine jumps to step 120. Although in this embodiment, a set period of time is used before going to step 120, other arrangements can be used, such as requesting the user for an input on whether the user would like to proceed to step 120. In step 120, the control routine returns control of the printing-capable device to the control routine in which the control routine of FIG. 3 operates.

In step 116, the control routine retrieves the email message from the mail server 18 that corresponds to the selected header and continues to step 118. In step 118, the control routine prints out the selected message and returns to step 112. Optionally, the control routine may also retrieve any attachments associated with the selected header and also print out the attachments using the corresponding software applications.

While the above description describes access to the methods of the invention via a "get email" function, it is understood that the specific nomenclature for the function is irrelevant to the invention.

Figure 4:
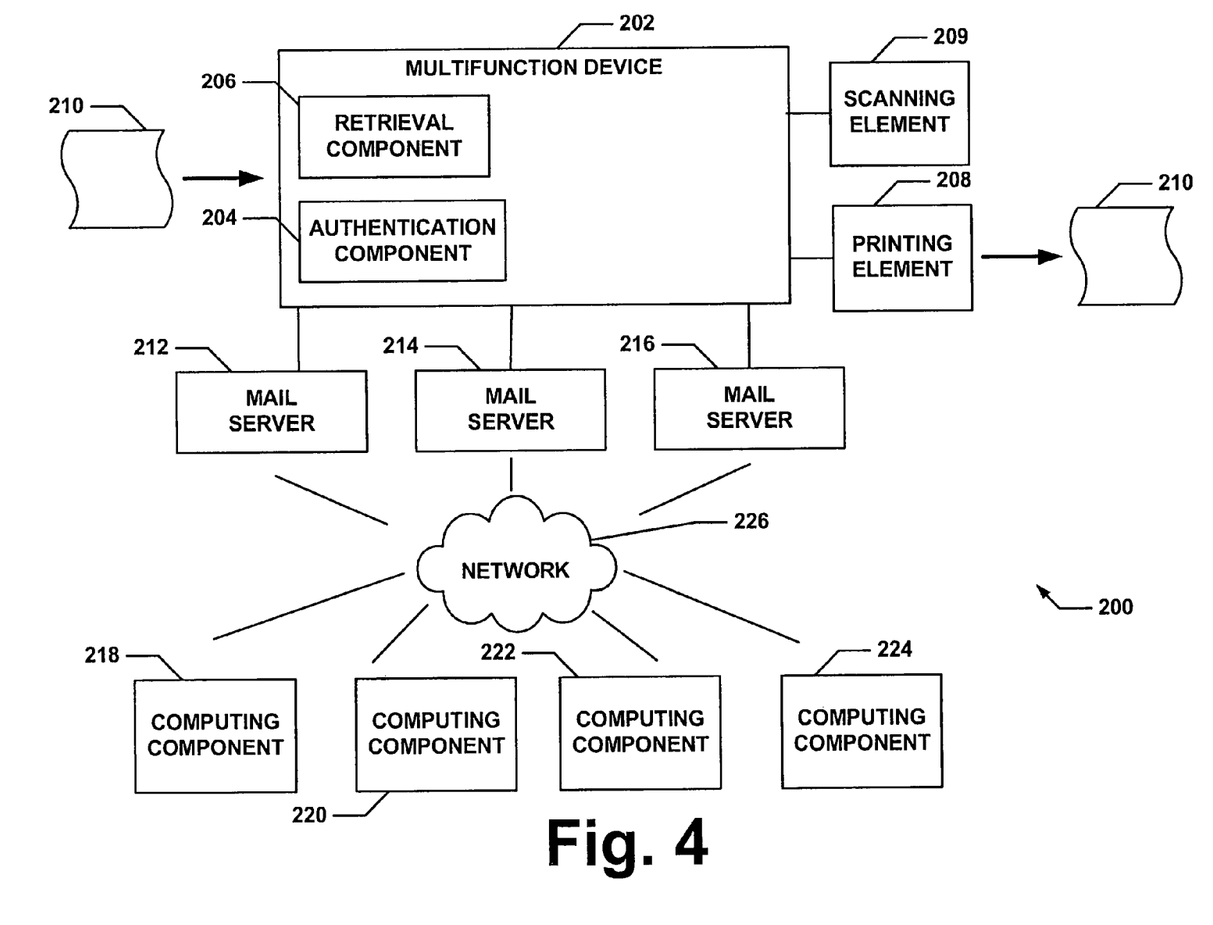
FIG. 4 illustrates a system that allows a user to retrieve and print email via a document surrogate in accordance with an exemplary embodiment.

FIG. 4 illustrates a system 200 that allows a user to retrieve and print email via a document surrogate in accordance with an exemplary embodiment. A user can utilize a multifunction device (MFD) 202 to provide access to one or more emails the user wishes to print. The MFD 202 includes an authentication component 204, a retrieval component 206, a printing element 208, and a scanning element 209. It is to be appreciated that although these components are included in the MFD 202, the components can be located in a plurality of devices.

The authentication component 204 can be employed to identify the user. The retrieval component 206 utilizes data entered by a user to locate and retrieve one or more emails in accordance with the data received. The printing element 208 can print documents as desired by a user. The scanning element 209 can digitally encode data from a hardcopy for storage, editing and subsequent retrieval. A document surrogate 210 can be created and/or employed to retrieve one or more email messages.

The system 200 can be employed by a user to access, display and print one or more emails. In one embodiment, the authentication component 204 employed with MFD 202 can request information related to a user's account. For instance, a username, a password, an ID code, a biometric, etc. can be utilized to accurately identify a user and related account(s). Once identified, the retrieval component 206 can locate and access one or more emails as directed by the configuration component 228. The presentation component 230 can display the one or more emails to a user. From this list, a user can select one or more emails to be printed from the MFD 202 and/or select one or more emails to be listed on the document surrogate 210. Emails included on the document surrogate 210 can be selected by a user by marking the document surrogate 210 to indicate selection.

Once marked, the document surrogate 210 can be placed on the scanning element 209 which can digitally encode the data contained therein. As described in detail below, one or more particular scanning routines can be employed based on the location of key data elements on the hardcopy scanned. For example, the document surrogate 210 can contain one or more identifying characteristics that prompt the scanning element 209 to initiate a particular scanning routine. Such routine can target specific areas of the document surrogate for scanning.

In addition or alternatively, the scanning element 209 can retrieve data contained in a machine readable code on the document surrogate 210. This information can provide one or more identifying characteristics related to the user, one or more user email accounts, one or more user preferences, etc. Information obtained from the document surrogate 210 via the scanning element 209 can be employed to locate and print one or more emails.

In one example, data obtained by the scanning element 209 can be sent to the retrieval component 206. The data from the scanning element 209 can specify one or more emails to locate and print. In one approach, the retrieval component 206 has a memory (not shown) that stores the retrieved emails. These emails can be transmitted to the printing element 208 and printed.

The authentication component 204 can determine the identity of one or more users. In one approach, identity can be ascertained by receiving a user name and password. In another approach, a smart card, token, biometric, etc. can be read by the authentication component 204 to determine the identity of a user. Once a user is identified, the authentication component 204 can associate the user with one or more profiles via a lookup table, a database, a memory bank, etc. Each profile can include one or more email accounts at one or more locations. For example, a profile for "jsmith" can be associated with email addresses jsmith@example.net, jsmith1@example1.net, and steven@example2.com.

The retrieval component 206 can be employed to locate and retrieve emails in one or more locations. The retrieval component 206 can employ standard protocols and/or methods of communication to establish a connection to one or more of the mail servers 212-216. Once connected, a search of the contents of the one or more of the mail servers 212-216 is performed. In one embodiment, the user identity determined by the authentication component 204 can dictate the location and contents that are searched for retrieval.

The printing element 208 can print pages based on data received from one or more sources. The printing element 208 can be a platform that can print simplex and/or duplex pages with color, black and white, highlight color, etc. portions within each side of each page. In addition, the printing element 208 can include one or more independent modules (e.g., printers) that are interconnected in parallel and/or series to provide concurrent and/or serial processing of one or more jobs. Such modules may be independent in that each module is capable of processing a job(s) independently of the other modules. Each module can include one or more marking engines, and each marking engine can be associated with similar and/or different attributes (e.g., processing rate, a type(s) of toner, etc).

The scanning element 209 can electronically encode information contained in one or more documents. A document feeder (not shown) can be employed to automatically position a document(s) in order to scan and encode the information contain in the document. Scanning can be accomplished utilizing any size, color, resolution, etc. as desired. In one embodiment, the scanning element 209 can be configured to detect particular data, such as a marker for example. A marker can indicate that a particular document is a document surrogate. Further, a marker can indicate that data (e.g., machine readable code, human readable code, etc.) is in a particular location on the document (e.g., upper right corner, same half as the marker, etc.).

A document surrogate 210 can be employed by a user to select one or more emails to retrieve and print email at a particular location. The document surrogate 210 can be created by a user via the MFD 202. A user can view one or more emails, create a document surrogate 210 based on the one or more emails, and print the one or more emails. The one or more emails a user wishes to print can be selected by marking the document surrogate 210 and scanning the marked document surrogate 210 via the scanning element 209.

In one example, the document surrogate 210 is created via an algorithm that specifies formatting, location of information, content of information, etc. Once the system 200 is informed that a page is a document surrogate (e.g., document surrogate 210), the system "knows" where to scan the page for file attribute information. In one example, the system 200, interpreting the document surrogate 210, automatically scans the upper left hand corner to determine if the image has a flag, denoting whether the page is a document surrogate. If so, the system 200 scans the image at standardized locations for a machine readable label and directory. As described in greater detail below, these areas contain information that enable the system 200 to prepare electronic storage space in which to read information on the page. The machine readable areas can point to a stored digital file or set of files that can be read and recognized by a document processing system.

The MFD 202 processes the image of the document surrogate 210. In the presently preferred embodiment, the MFD 202 reads the digital data stored on the document surrogate 210, decodes the digital paper file, and stores the resulting electronic translation of the paper file into storage (not shown). Other image operations involving compilation/transformation of data are possible. For example, encryption/decryption may be performed on the binary data.

On the output side, the MFD 202 can be employed to create one or more document surrogates from stored electronic files. The MFD 202 can transform one or more electronic files into a page image. It is to be appreciated that the above transformation may take place between a wide variety of data formats and that the present invention encompasses all transformations between possible format domains. For example, the electronic file may be stored as an ASCII file, some word processing format, or the like. Likewise, the image may be formed to conform to any number of page description formats, raster image formats or the like.

Collectively, the machine readable areas point to a stored digital file or files that is read and recognizable by the MFD 202 or a document processing system such as a digital copier, system reprographic device, fax machine, page scanner or the like. Upon encountering the document surrogate 210, the MFD 202 locates data from the image of the document surrogate 210. The MFD 202 can interpret the data of the document surrogate 210 to be files stored on an external storage device, such as the mail servers 212-216, computing components 218-224, etc. Once interpreted, the file or files and their associated information can be read from the document surrogate 210. The system 200 then creates one or more electronic files with either specified or default names and stores the information into said file or files.

The MFD 202 interfaces with mail servers 212, 214, and 216, etc. The MFD 202 can communicate with the mail servers utilizing one or more protocols, domains and/or standards such as TCP/IP, PPP, SMTP, LAN, WAN, etc. Moreover, communication between the MFD 202 and the mail servers 212-216 can be facilitated via wireless and/or wired communications. In one example, the mail server 212-216 can be a computer within a network.

The mail servers 212-216 can consist of a storage area where e-mail is stored for local users. A set of user definable rules can determine how the mail server should react to the destination of a specific message. A database (not shown) of user accounts can be employed that the mail server recognizes and will employ locally. Communications modules (not shown) can handle the transfer of messages to and from other mail servers and email clients.

The mail servers 212-216 can communicate with computing components 218-224 via a network 226. The computing components 218-224 can be one or more of a mainframe, a personal computer, a laptop computer, a cell phone, a tablet computer, and a personal digital assistant. The computing components 218-224 can include a processor, a memory, a display, and one or more peripheral devices to interface with the other computing components 218-224. The computing components 218-224 can be employed by one or more users to generate, receive and view emails. Such emails can be received and/or sent via the network 226 and/or one or more alternate communication paths.

In one example, the computing component 218 is a personal computer that employs email client software. The email client software can allow a user to configure the receipt of email, compose email, send email and store email for subsequent access. In addition, a user can store emails in one or more folders organized as desired. For instance, folders can be related to "Work," "Personal," "School," etc. Also, within each folder one or more subfolders can be created and so on. In this manner, a user can readily store and access email in an organized fashion.

The email viewed by a user via the computing components 218-224 can be stored on one or more of the mail servers 212-216. Messages stored on the mail servers can be addressed to allow simple subsequent retrieval. For instance, a third party component (e.g., MFD 202) can easily access data from the mail servers 212-216 by specifying an address which relates to an email message on a particular server.

Figure 5:
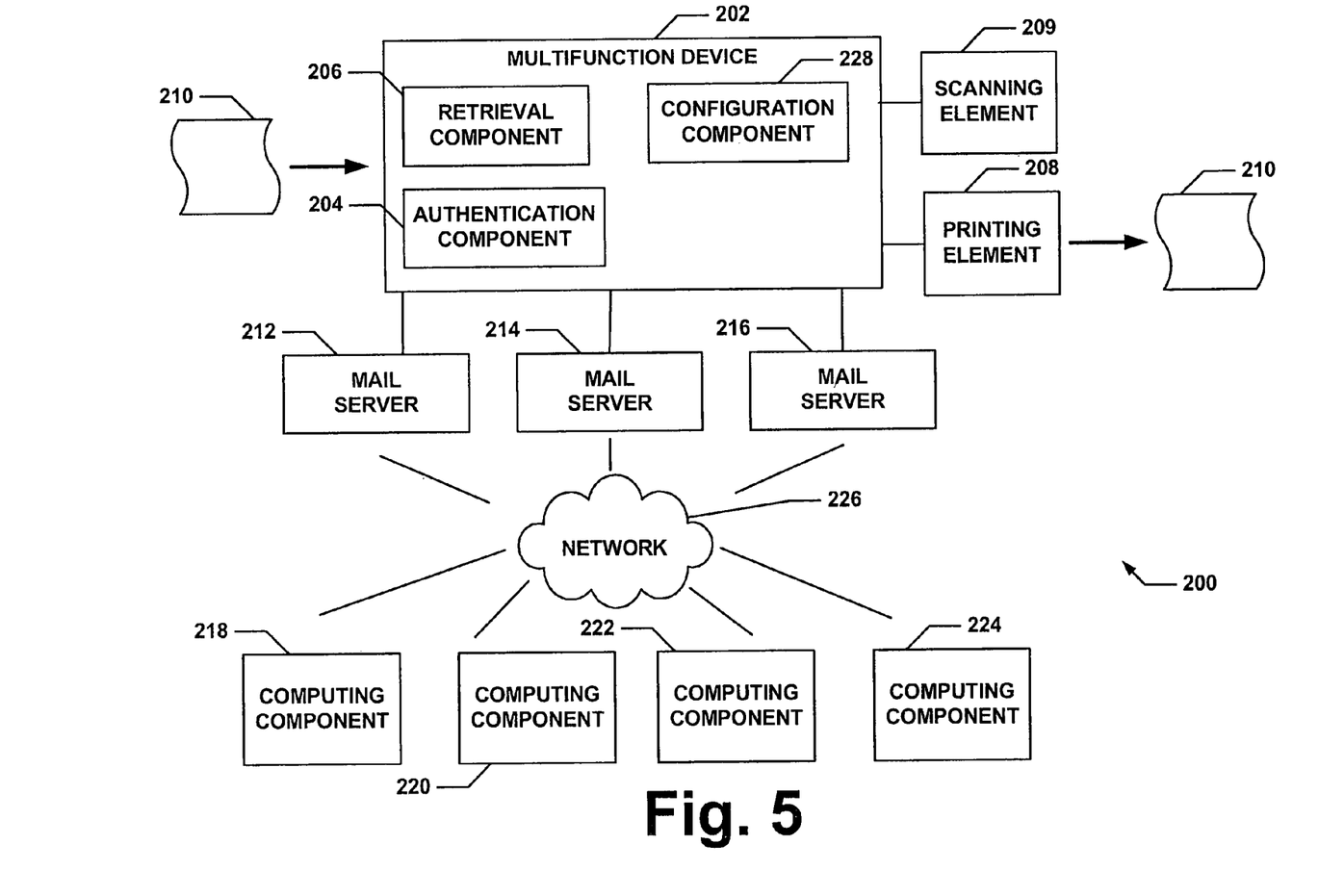
FIG. 5 illustrates a system that allows a user to configure, retrieve and print email via a document surrogate in accordance with an exemplary embodiment.

FIG. 5 illustrates the system 200 wherein the MFD 202 further includes a configuration component 228. The configuration component 228 allows a user to configure one or more preferences related to accessing email. For instance, the configuration component 228 can allow a user to determine one or more locations for email retrieval. In one approach, one or more locations on one or more mail servers can be associated with a user account. In another approach, email can be stored in substantially any location, including the computing components 218-224. In addition or alternatively, an order of accessing emails in various locations can be specified.

The configuration component 228 can interface with the retrieval component 206 to provide a set of rules to direct the actions of retrieving email from one or more sources. In one approach, the configuration component 228 can be employed to specify one or more conditions related to accessing email. For example, three email accounts can be specified by a user. A condition can be created wherein if there is no email at a first location, proceed to a second location and attempt to access email from the second location. Alternatively or in addition, other conditions such as time of day, number of emails, locations of email, etc. can be specified to configure access preferences.

In another embodiment, the configuration component 228 can be employed with a publicly accessible machine. In this approach, the configuration component 228 is not preconfigured at the time of use. For example, one or more instruction sets, algorithms, look-up tables, etc. can be downloaded to the configuration component 228 upon user authentication. In this manner, configuration of retrieval and presentation of email can be specific to each user.

Figure 6:
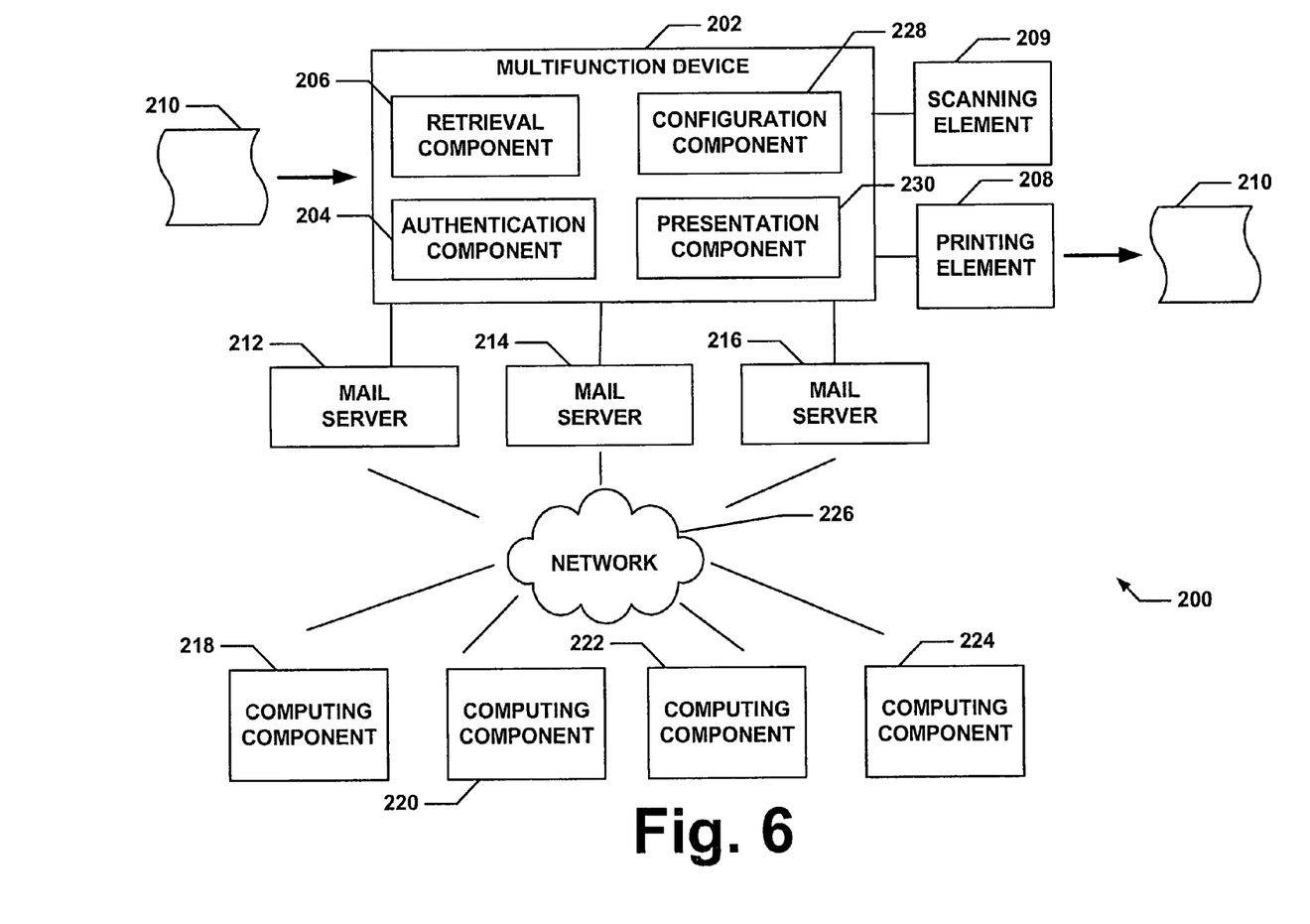
FIG. 6 illustrates a system that allows a user to view, configure, retrieve and print email via a document surrogate in accordance with an exemplary embodiment.

FIG. 6 illustrates the system 200 wherein the MFD 202 further includes a presentation component 230. The presentation component 230 can allow a user to access and configure the MFD 202. In one approach, the presentation component 230 is an LCD, LED, touch screen, etc. that provides information to a user. The presentation component 230 can provide text, graphics, animation, etc. to present information in substantially any format. In addition, a series of prompts can be employed to direct a user to input appropriate information to the MFD 202.

The presentation component 230 can be configured to present information displayed to a user. In particular, information related to email messages can be predetermined. Such information can be displayed in order to provide a distilled version of information to a user. This information can allow a user to review a plurality of email messages by viewing one or more aspects, portions, etc. of each email message. In this manner, a user can view a greater amount of information in situations where the size of the presentation component 230 is limited.

In one approach, the presentation component 230 can include one or more options for presentation of information to a user. The one or more options can each represent a particular presentation configuration. For example, an option can be employed to present all unread email, email sent in a particular time frame (e.g., last five days, etc.), email from a particular sender, email in a particular location (e.g., "Work," "Personal," "School," folders, etc.). Alternatively or in addition, one option can represent a default presentation that is preconfigured by the user. In this manner, one or more options can allow a user to quickly and easily select a particular presentation configuration.

In one example, the retrieval component 206 can be configured by the configuration component 228 and the authorization component 204 to access all emails from a location called "Inbox" from mail server 214. In another example, email can be retrieved from a particular location on one or more of the computing components 218-224. The location can be one or more folders created within email client software. For instance, personal email can be located in a "Personal" folder within an "Inbox" folder within the email client software. Substantially any location for email is contemplated.

Emails retrieved can be displayed to a user via the presentation component 230. In one approach, email header information is parsed such that only the sender name and subject are displayed. A user can then quickly scan through the emails to determine which, if any, to print.

As a further example, a user can instead select one or more emails to include in the document surrogate 210. In this example, the MFD 202 can send the selected email information to the printing element 208 which can create the document surrogate 210. In this approach, a user can quickly select a plurality of emails to be listed on the document surrogate 210. Afterward, a user can more particularly identify which of the emails, if any, identified in the document surrogate 210 he/she would like to print. In this manner, the document surrogate 210 allows a user flexibility to select emails to print while away from the MFD 202.

Figure 7:
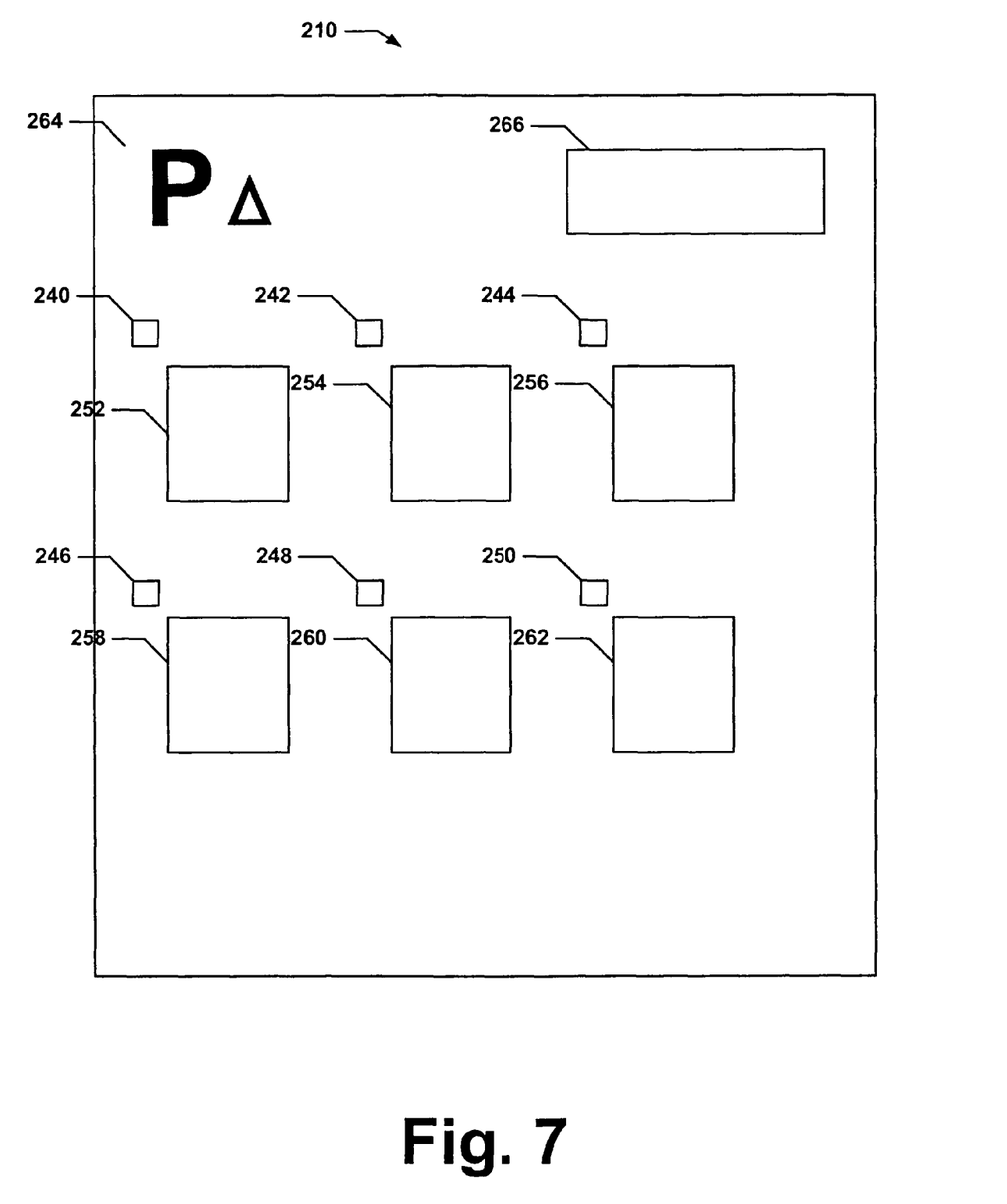
FIG. 7 illustrates an embodiment of a document surrogate in accordance with an exemplary embodiment.

The document surrogate 210 can include a plurality of information related to various aspects of email messages. In one example, as shown in FIG. 7, a thumbnail view of several emails can be viewed at once. This information can allow a user to make a decision to print one or more emails. A default can be established such that predetermined data, fonts, formatting, fields, etc. can appear on the document surrogate 210. In this manner, a user can create the document surrogate 210 to present information in a preferred format.

A user can mark one or more check boxes 240, 242, 244, 246, 248, and 250 to indicate which emails to print. Although the check boxes 240-250 are shown as small squares adjacent to each email, various alternative embodiments are contemplated. For example, the check boxes 240-250 can be substantially any shape and/or size and/or number.

Instead of a checkbox, an area surrounding text or thumbnail representation can be monitored during the scanning process. Thus, when a user wishes to print one or more emails, such an indication can be made by circling or placing a mark within the proximity of the area monitored. It is to be appreciated that substantially any marking on the document surrogate 210 can be employed to indicate one or more emails is to be printed. The mark could be a physical mark made with pen or pencil or the like. Such marks can be scanned in as data that represent selection of one or more email messages. This data can be processed by the MFD 202 after image capture.

In one example, the document surrogate 210 comprises a sheet of paper with a human readable summary showing reduced images 252, 254, 256, 258, 260, 262 of the first six pages of the original document. Methods of producing reduced page images from full images are well known in the arts of image processing and xerography. The size of the reduction can be such that the reduced image gives the user a reasonable representation of abbreviated contents to identify the full document.

The upper left hand corner of document surrogate 210 contains a marker 264. The marker 264 can be used as a "flag" to distinguish the page as a document surrogate from ordinary (e.g., non-surrogate) pages. The marker 264 can be optional in the sense that the other methods for "flagging" are available and are discussed below. It will be appreciated that the actual shape and location of the marker 264 is arbitrary to the extent that the system is able to uniquely identify the page as a document surrogate.

The upper right hand corner of the document surrogate 210 can contain machine readable code 266. The code 266 may encode various types of information about the form. For example, the code 266 may encode the fact that a particular page is a document surrogate. This might be accomplished by including a surrogate data field in the code 266. In one example, the surrogate data field might be a Boolean or some multi-valued data item. If the code 266 acts as a flag, marker 264 would be a redundant and can be deleted.

Another way of embedding a "flag" in code 266 is by using an "indicator". An "indicator", in the present context, is a general way of pointing to some object. An indicator can be an address pointer to a real or virtual address (e.g., location of a particular mail server, etc.). Other information may be embedded in code 266. For example, code 266 may also contain information about which type of human readable document summary is included on surrogate 210. It is to be appreciated that the actual locations of the human and machine readable information is unimportant.

In one embodiment, code 266 is encoded in the form of "glyphs". Glyphs are a manner of encoding data with a series of marks that slant either from top-left to bottom-right or from bottom-left to top-right. A method of encoding in glyph forms is disclosed in Klotz patents (U.S. Pat. No. 5,459,307 and 5,682,540), which are incorporated herein by reference. Although glyph codes are contemplated, it is to be appreciated that many machine readable codes are well known in the art and that the present invention should not be limited by the manner of encoding.

Figure 8:
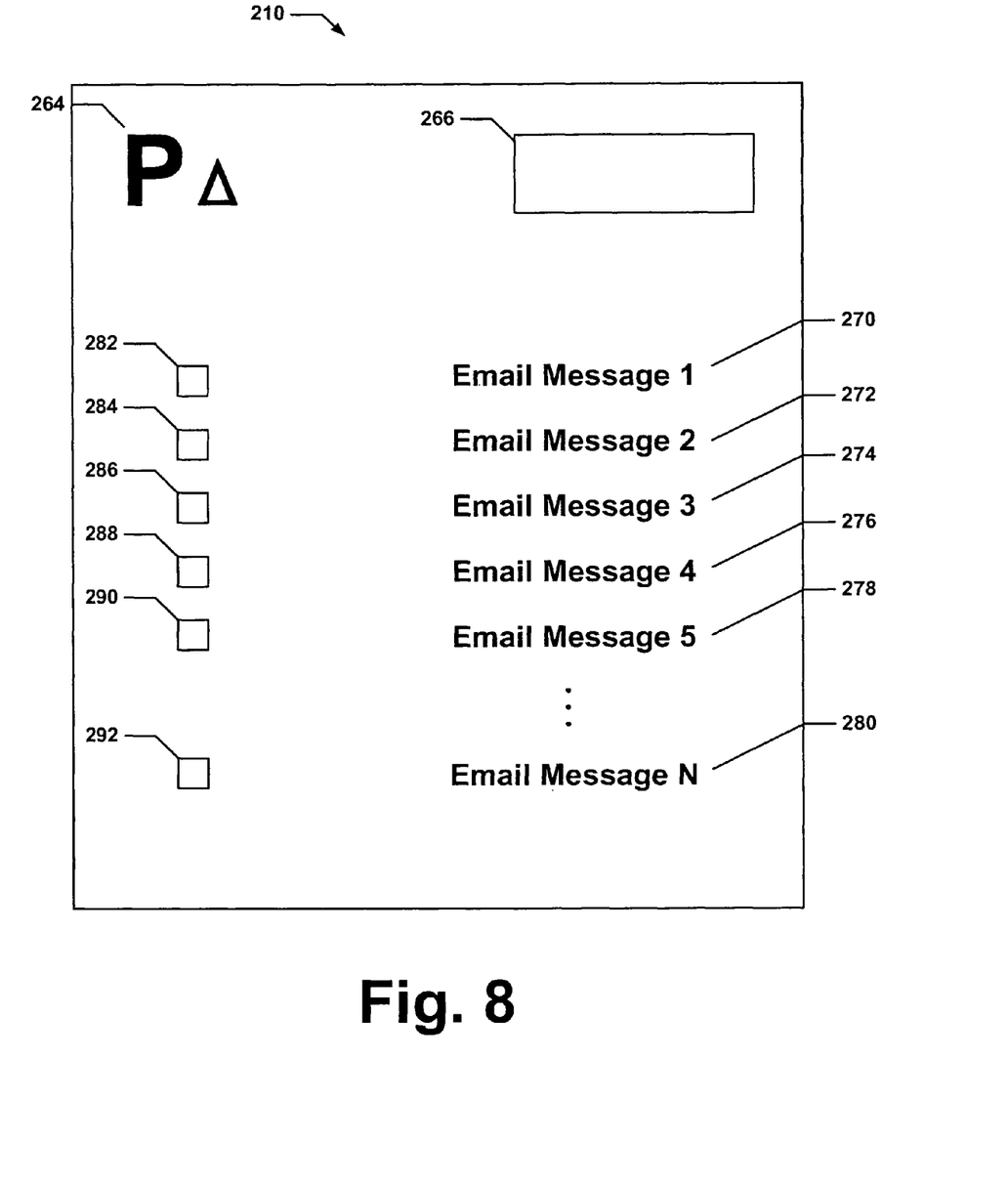
FIG. 8 illustrates an embodiment of a document surrogate in accordance with an exemplary embodiment.

In another example, as illustrated in FIG. 8, the document surrogate 210 can include a listing of emails represented by email fields 270, 272, 274, 276, 278 and 280. Each of the emails 270-280 has a corresponding check box 282, 284, 286, 288, 290, and 292. The check boxes 282-292 can be utilized to select one or more of the emails 270-280. Selection can be accomplished by placing a mark (e.g., check mark, an "X," etc.) or filling in the interior of the check boxes 282-292.

The emails that appear on the document surrogate 210 can be preselected utilizing the multifunction device. The email fields 270-280 can include substantially any identifying data related to each email. For instance, each email field 270-280 can be represented by the first one hundred characters of the message. In another approach, the email fields 270-280 can contain the sender's name and first fifty characters of the subject line. It is to be appreciated that substantially any data related to an email can be included in an email field 270-280. Such information can be related to header information, day and time, email content, etc.

In addition, email messages listed on the document surrogate 210 can be preselected based on their location. In this example, location can refer to the server upon which the email is located and/or a particular location within a user's email client software. For instance, the document surrogate 210 can contain all of the emails contained in a particular user's folders such as "Inbox," "Outbox," "Work," and the like. In another example, the document surrogate 210 can list all emails at a particular server address/location. It is to be appreciated that an email can be stored and retrieved from substantially any location.

Figure 9:
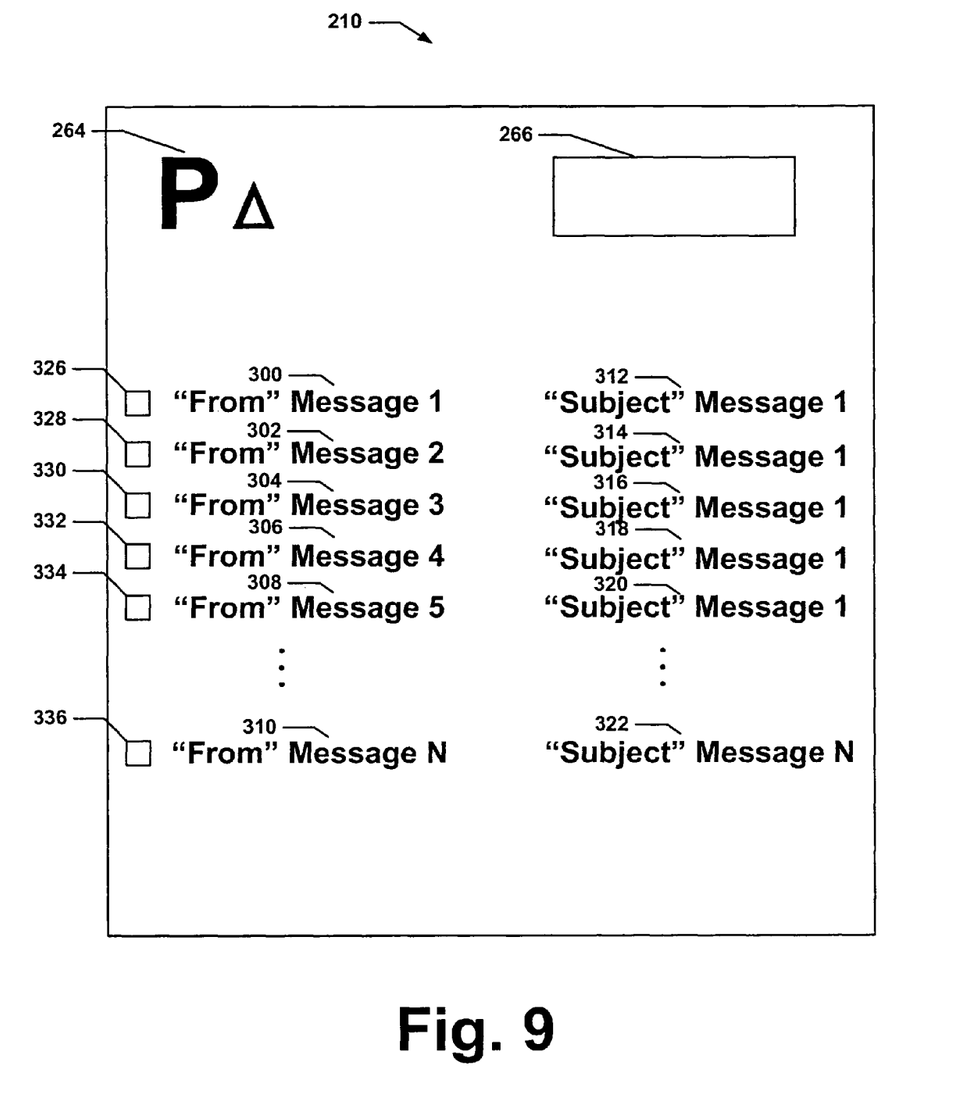
FIG. 9 illustrates an embodiment of a document surrogate in accordance with an exemplary embodiment.

In yet another example, as illustrated in FIG. 9, the document surrogate 210 can list fields related to one or more emails. In this manner, such email fields can be highlighted to simplify location and retrieval of appropriate email information. For instance, particular email fields such as the "From," "To," "Subject," "Date/time," etc. can be presented and selected by a user. In this example, a user can select one or more emails from a list represented by items 300-322 via selection boxes 326-336.

As shown, the items 300-322 relate to two different email fields. Items 300-310 include the "From" email field and items 312-322 include the "Subject" email field. The "From" email field can include the name, email address, and/or other information indicative of the party from whom an email was sent. The "Subject" email field can include data contained in the subject line of an email. Data in any email field can be limited by a word and/or letter limit (e.g., first fifty characters listed, etc.). Such a truncated data set can be chosen to provide enough information to allow a user to determine whether or not to print a particular email.

Figure 10:
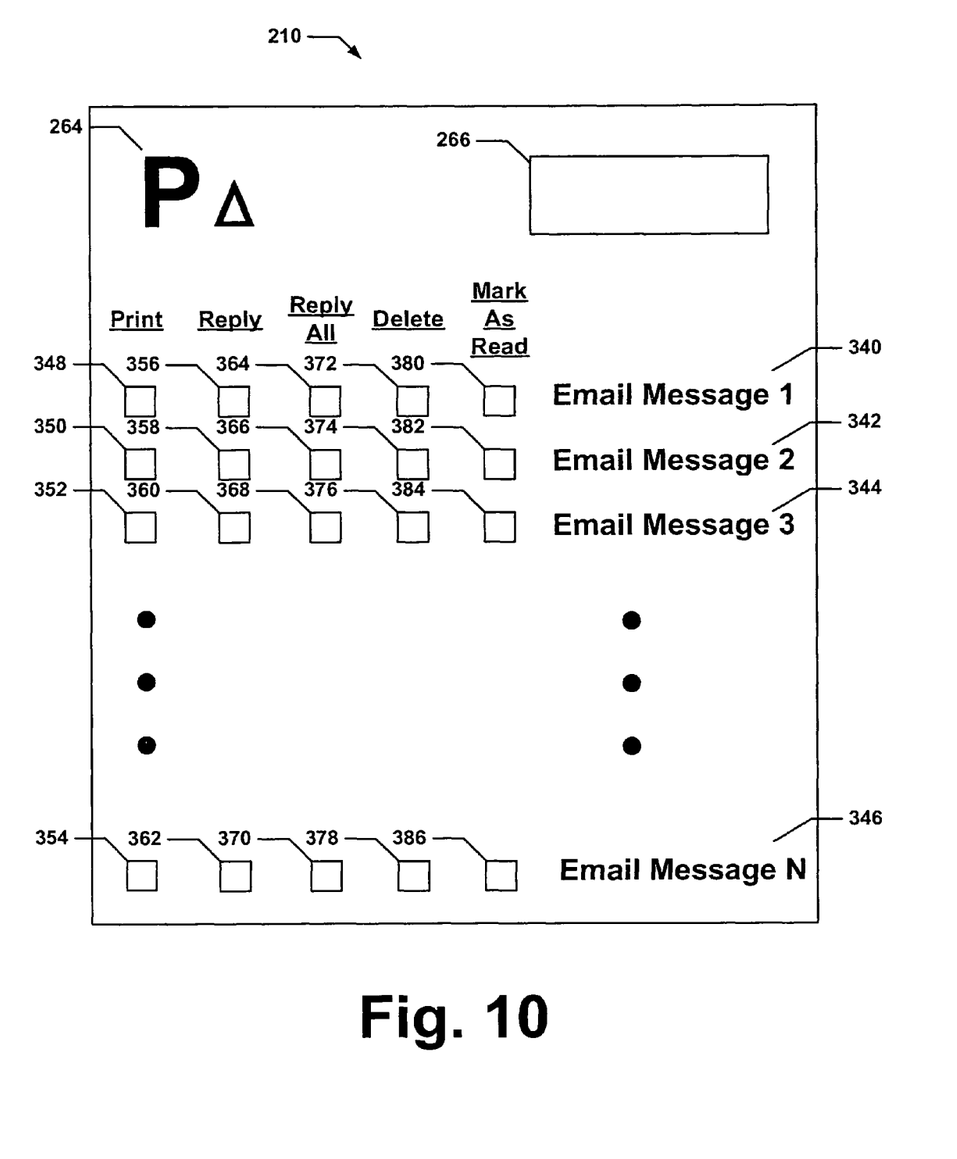
FIG. 10 illustrates a method to select and print email utilizing a document surrogate in accordance with an exemplary embodiment.

FIG. 10 shows the document surrogate 210 that allows a user to select one or more actions associated to each email 340-346. For example, a user can choose one or more of print, reply, reply to all, delete, mark as read, etc. with relation to each email. Check boxes are employed to allow a user to indicate whether they wish to perform the associated operation. "Print" boxes 348, 350, 352, and 354 are selected to print the associated email, as described above.

"Reply" boxes 356, 358, 360, and 362 can be selected to send a reply message to the sending party. This reply can contain a preconfigured message and/or include an attachment which is scanned along with the document surrogate, wherein the attachment is emailed as a reply to the originator of the designated email. "Reply All" boxes 364, 366, 368, and 370 can be selected to reply to everyone listed on the email as a recipient or as a carbon copy. Similarly, the "reply all" can include a scanned attachment. "Delete" boxes 372, 374, 376, and 378 can be employed to delete an email from the location in which it is stored. "Mark as Read" boxes 380, 382, 384, and 386 can be utilized to mark the email as read. It is to be appreciated that substantially any type of functionality is contemplated and can be represented by one or more check boxes.

Figure 11:
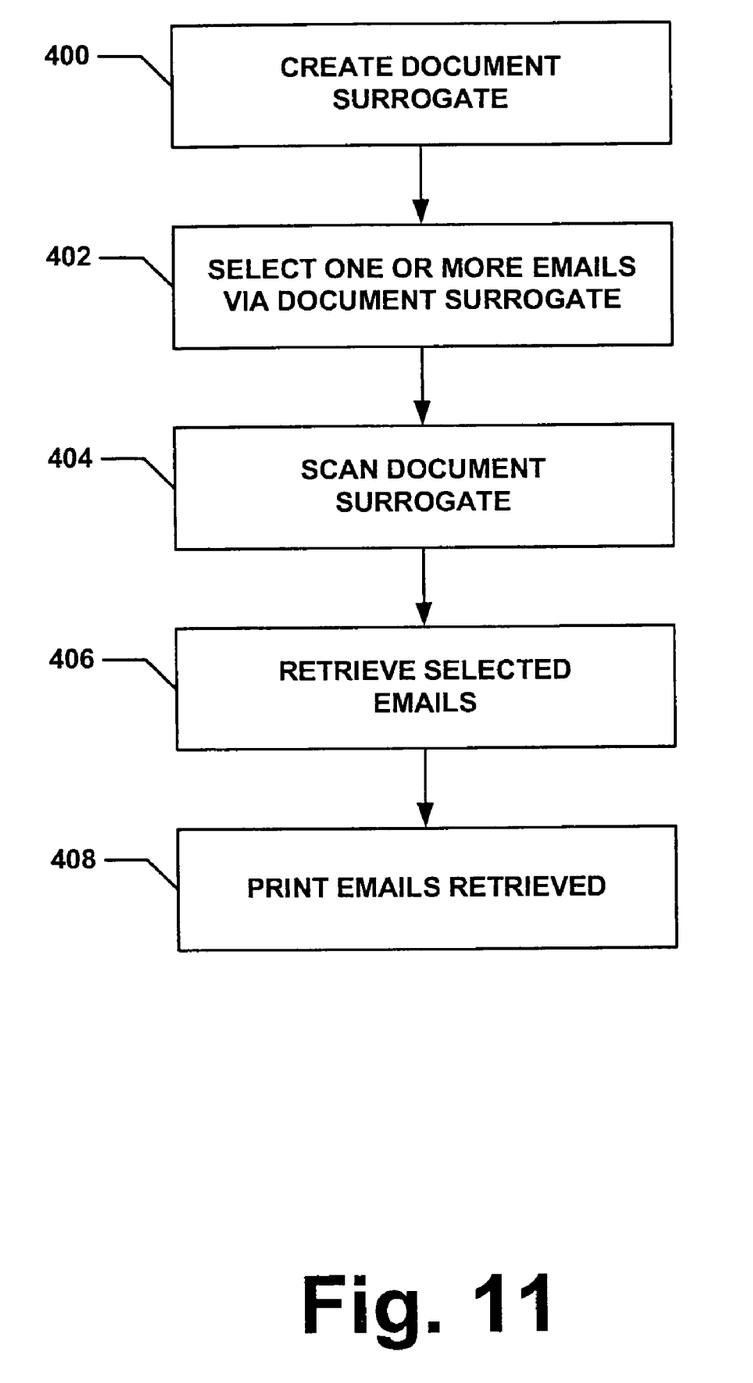
FIG. 11 illustrates a method to retrieve and print one or more emails.

FIG. 11 discloses a method to retrieve and print one or more emails. At reference numeral 400, a document surrogate is created. The document surrogate is a hard copy that lists one or more emails at one or more locations. The document surrogate fields can be one or more of a human readable field and/or a machine readable field. Either type of document surrogate field can contain additional information, instructions, default settings, etc. related to retrieval and printing of email messages.

The document surrogate can be identified (e.g., by a scanner, by a user, etc.) via a marker or other means. In one example, the marker is a combination of unique characters in a particular location on a document. Each email can be represented in substantially any manner such as a thumbnail view, a text summary, one or more email fields, etc.

In one approach, a selection box is adjacent to each email represented to allow a user to indicate selection of one or more emails. At 402, one or more emails are selected via the document surrogate. Selection of the one or more emails can be accomplished by placing a mark in a selection box. In another approach, selection can be indicated by placing a mark outside of a selection box, such as circling an email representation.

At 404, the document surrogate is scanned. In one approach, scanning is performed by a scanner included in a multifunction or similar device. The scanner can be programmed to identify a document surrogate. Identification can be accomplished by the presence or absence of a marker on the document surrogate. Once a document surrogate is identified, data can be extracted that relates to the selection and identification of one or more email messages. In one example, one or more marked selection boxes are associated with one or more email messages. In another approach, one or more circled document surrogate fields are associated with particular email messages.

In one example, the upper left hand corner is automatically scanned to determine if the image has a marker, denoting whether the page is a document surrogate. If so, the image is scanned at standardized locations to locate and retrieve data contained therein. These areas can contain information that allows electronic storage space to be prepared in which to read the information (e.g., binary, optical character recognition data, etc.) on the page. The machine readable areas can comprise a stored digital file or set of files that can be read and recognized by a document processing system.

In an exemplary embodiment, document surrogates can be construed in several ways. Document surrogates can be construed to be the equivalent of either original documents or executable processes or the results of such processes. In either case, document surrogates are always construed as an equivalence of one of these "associated objects" unless this equivalence is specifically disabled. A separate "indicator", embedded in one or more codes contained therein, points to which associated object it is equivalent. Executable processes which generate results may either be external, such as outside processes or internal, such as stored processes.

It is the associated object that is processed in lieu of the document surrogate. For example, copying a document surrogate will cause a print of the associated object as opposed to a copy of the document surrogate. This separation of objects from functions is one advantage of document surrogates. The document surrogate itself is not required to specify the details of the executable process that needs to be performed on the associated object. Thus, processing may occur at a remote location and/or a later time. In one example, a process associated with retrieval and printing of an email can be specified by the user on the document surrogate which initiates an executable process at a remote location. This separation gives users greater flexibility in the paper based user interface.

At 406, selected emails are retrieved. The location, content, data path, etc. related to the one or more email messages selected can be obtained from scanning at 404. In one aspect, retrieval can include locating and identifying a header of an email message. The content of the one or more email messages retrieved can include only particular information. For example, retrieval of the one or more email messages can include a "From" email field, a "Date" email field and the email message contents. It is to be appreciated that substantially any portion of the one or more email messages can be retrieved.

The scanning and/or retrieval of the document surrogate can initiate one or more processes. For example, once the document surrogate has been scanned, systems can be initiated to print the one or more emails after they have been retrieved. At 408, the one or more emails retrieved are printed. In one embodiment, scanning and printing can be performed by a single component, such as multifunction device for example. As noted, the document surrogate can determine the portion of each email that is printed. For instance, the "Subject" email field and email message contents can be printed.

The disclosed methods may be readily implemented in software using object-oriented software development environments that provide portable source code that can be used on a variety of printing-capable computer or workstation hardware platforms. Alternatively, the disclosed modeling system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The email access systems and methods described above, however, can be readily implemented in hardware and/or software using any known or later-developed printing-capable systems or structures, devices and/or software by those skilled in the applicable art without undue experimentation from the functional description provided herein together with a general knowledge of the computer arts.

Moreover, the disclosed methods may be readily implemented as software executed on a printing-capable, programmed, general-purpose computer, a special purpose printing-capable computer, a microprocessor, or the like. In this instance, the methods and systems of this invention can be implemented as a routine embedded on a printing-capable personal computer such as a Java® or CGI script, as a resource residing on a server or graphics workstation accessible by the printing-capable device, or the like. The email access system can also be implemented by physically incorporating the system and method into a software and/or hardware system, such as the hardware and software systems of a dedicated computer controlled printing-capable system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

The invention claimed is:

1. A system that prints email messages, comprising:
a document surrogate that represents a plurality of email messages selected by a user, said document surrogate including multiple selection areas corresponding to each selected email message, wherein said multiple selection areas can accept a user generated mark indicative of a desired function said function including at least one of print, reply, reply all, delete, and mark as read;

a multifunction device that prints, scans, emails, faxes, and copies one or more documents, the multifunction device includes:

a scanning element that scans the document surrogate, electronically encodes information contained therein, and retrieves data contained in the one or more multiple selection areas, the information is associated with at least one of the location, content, and status of the one or more email messages;

a retrieval component that establishes a connection to one or more mail servers remote to the multifunction device, searches associated contents of said one or more mail server, and retrieves the one or more emails selected based at least in part upon information contained in the document surrogate, said retrieval component including memory that stores the retrieved emails; and a printing element that prints the one or more emails retrieved.

2. The system according to claim 1, further including:
an authentication component that receives information from a user and identifies the user based at least in part upon the information received.

3. The system according to claim 2, wherein the information is provided via one of a user name and password, a smart card, a token, and a biometric.

4. The system according to claim 2, wherein the authentication component associates the user with one or more profiles via at least one of a lookup table, a database, and a memory bank, each profile includes one or more email accounts at one or more locations.

5. The system according to claim 1, further including:
a configuration component that allows a user to configure one or more preferences for at least one of a location for email retrieval, content of email retrieved, an order of accessing email, and a condition for email retrieval.

6. The system according to claim 1, wherein said at least one mail server stores one or more emails associated with a user, the mail server can transfer messages to and/or from one or more disparate components.

7. The system according to claim 6, further including:
at least one computing component that employs email client software to at least one of generate, receive, store, edit, organize and view one or more emails, the computing component includes at least one of a processor, a memory, a display, and a peripheral device; and a network that facilitates communication between the at least one computing component, the at least one mail server, and the multifunction device.

8. The system according to claim 1, wherein the document surrogate is a page that contains at least one of:

a marker that distinguishes the page as a document surrogate from non-surrogate pages;

a document surrogate field that contains information associated with the identification, location and retrieval of one or more email messages; and a selection area related to each email wherein a user can place a mark within a proximity of the selection area to indicate selection of one or more emails.

9. The system according to claim 8, wherein the scanning element identifies the document surrogate by locating the marker contained therein, extracts data from a hardcopy based at least in part upon the document surrogate field, and storing data obtained from the hardcopy.

10. The system according to claim 8, wherein the document surrogate field is a glyph that directs the multifunction device to one or more processes located in one or more files that are remote to the multifunction device.

11. A multifunction device that retrieves email messages, comprising:

an authentication component hat identifies a user based upon information entered by the user;

a retrieval component that establishes a connection to one or more mail servers, searches associated contents of said one or more mail server, and locates and retrieves one or more emails based at least in part upon the user's identification;

a configuration component that allows a user to configure one or more preferences related to accessing email, wherein said configuration component is capable of interfacing with the retrieval component to provide a set of rules for retrieving email;

a presentation component that displays a distilled version of the one or more emails retrieved by the retrieval component based on a selected presentation configuration, wherein the user selects one or more emails;

a printing element that prints a document surrogate that represents the one or more email messages selected by a user, said document surrogate multiple selection areas corresponding to each selected email message and a machine readable marker that distinguishes a document surrogate from non-surrogate pages, that is representative of the one or more emails selected by the user, wherein said multiple selection areas can accept a user generated mark indicating a desired function, said function including at least one of print, reply, reply all, delete, and mark as read; and a scanning element that at least one of identifies said document surrogate by scanning a hardcopy and locating the machine readable marker contained therein, extracts data from the document surrogate based at least in part upon a mark within said multiple selection areas, and stores data obtained from the hardcopy.

12. The multifunction device according to claim 11, wherein the document surrogate is a page that contains at least one of:

a document surrogate field that contains information related to the identification, location and retrieval of one or more email messages.

13. The multifunction device according to claim 12, wherein the document surrogate field points to an object to which it is equivalent, the object is associated with at least one executable process.

14. The multifunction device according to claim 11, wherein the data obtained from the hardcopy is employed by the retrieval component to locate and retrieve one or more emails, the emails retrieved are sent to a printing element and printed.

15. The multifunction device according to claim 11, further including:
a printing element that receives data based at least in part on data extracted from the document surrogate by the scanning element and prints one or more email messages based at least in part upon the data received.

16. The multifunction device according to claim 11, further including:
an authentication component that receives information from a user and identifies the user based at least in part upon the information received.

17. The multifunction device according to claim 11, wherein said a configuration component allows a user to configure one or more preferences for at least one of a location for email retrieval, content of email retrieved, an order of retrieving one or more emails, and a condition for email retrieval.

18. A method for printing email, comprising:

creating a document surrogate that represents a plurality of email messages, wherein each email is associated with multiple selection areas, said multiple selection areas being indicative of a desired operation including at least one of print, reply, reply all, delete, and mark as read;

selecting one or more operations associated with each email messages via the document surrogate by placing a marking within at least one of the multiple selection areas;

scanning the document surrogate via a scanning element of a multifunction device, wherein said scanning element electronically encodes information contained therein and extracts data relating to the selection and identification of said plurality of email messages;

retrieving said emails based upon the document surrogate via a retrieval component of said multifunction device, wherein said retrieval component establishes a connection to one or more mail servers, searches associated contents of said one or more mail server, and storing retrieved emails in the retrieval component's memory; and performing each selected operation corresponding to the plurality of emails retrieved.

19. The method according to claim 18, further including:

locating a marker on the document surrogate and extracting information related to the marker; and locating at least one of a machine readable code and a human readable code based at least in part upon information extracted from the marker.

* * * * *